United States Patent
Creedon et al.

(10) Patent No.: US 6,882,661 B1
(45) Date of Patent: Apr. 19, 2005

(54) SYSTEM FOR DETECTION OF ASYNCHRONOUS PACKET RATES AND MAINTENANCE OF MAXIMUM THEORETICAL PACKET RATE

(75) Inventors: Tadhg Creedon, Furbo (IE); Denise De Paor, Carraroe (IE); Fergus Casey, Dublin (IE)

(73) Assignee: 3Com Corporation, Santa-Clara, CA (US)

( * ) Notice: Subject to any disclaimer, the term of this patent is extended or adjusted under 35 U.S.C. 154(b) by 781 days.

(21) Appl. No.: 09/662,157

(22) Filed: Sep. 14, 2000

(30) Foreign Application Priority Data

May 25, 2000 (GB) ............................................. 0012635

(51) Int. Cl.⁷ .................................................. H04J 3/07
(52) U.S. Cl. ...................... 370/505; 370/504; 370/236; 370/382; 370/383; 710/61
(58) Field of Search .................................. 370/236, 235, 370/236.1, 236.2, 383, 382, 384, 345.62, 503–507, 500, 412, 231, 232, 395.62, 516; 375/61, 57, 372, 356, 358; 710/61, 57

(56) References Cited

U.S. PATENT DOCUMENTS

| | | | | |
|---|---|---|---|---|
| 4,692,894 A | * | 9/1987 | Bemis ............................ | 710/57 |
| 4,807,121 A | * | 2/1989 | Halford ......................... | 710/53 |
| 4,945,548 A | * | 7/1990 | Iannarone et al. .......... | 375/214 |
| 5,179,664 A | | 1/1993 | Li et al. | |
| 5,222,108 A | * | 6/1993 | Suzuki ......................... | 375/372 |
| 5,323,426 A | * | 6/1994 | James et al. ................. | 375/372 |
| 5,428,649 A | * | 6/1995 | Cecchi ......................... | 375/372 |
| 5,513,224 A | * | 4/1996 | Holt ............................. | 375/372 |
| 5,654,979 A | * | 8/1997 | Levin et al. ................. | 375/142 |
| 5,764,900 A | * | 6/1998 | Morris et al. ................ | 709/203 |
| 5,822,327 A | * | 10/1998 | Satou ........................... | 370/505 |
| 6,289,066 B1 | * | 9/2001 | LaVigne et al. ............. | 375/372 |
| 6,400,785 B1 | * | 6/2002 | Sunaga et al. ............... | 375/372 |
| 6,594,329 B1 | * | 7/2003 | Susnow ....................... | 375/372 |
| 6,631,138 B1 | * | 10/2003 | Findlater et al. ............ | 370/446 |
| 6,728,209 B1 | * | 4/2004 | Pate et al. ................ | 370/230.1 |
| 6,741,603 B1 | * | 5/2004 | Pate et al. ................... | 370/412 |

FOREIGN PATENT DOCUMENTS

EP          0299265 A2     1/1989

* cited by examiner

Primary Examiner—Brian Nguyen
Assistant Examiner—Ian N. Moore
(74) Attorney, Agent, or Firm—Nixon & Vanderhye P.C.

(57) ABSTRACT

A system transfers a data stream including data packets separated by non-packet words from a first clock domain to a second clock domain. It includes an elasticity buffer into which the data stream is written in a cyclic sequence under the control of the clock frequency in the first clock domain and from which the data stream is read out in a cyclic sequence under the control of the clock frequency in the second domain. The two sequences are monitored to provide an anticipatory signal indicating that the reading sequence approaches proximity to the writing sequence. A non-packet word is inserted into the data stream in the first domain. In the second clock domain the existence of the inserted non-packet word is detected and the buffer is caused to advance the reading cycle thereby to discard the said inserted non-packet word.

10 Claims, 3 Drawing Sheets

SYSTEM FOR DETECTION OF ASYNCHRONOUS PACKET RATES AND MAINTENANCE OF MAXIMUM THEORETICAL PACKET RATE

FIELD OF THE INVENTION

This invention relates to systems, and particularly multiple chip devices, for the handling of data in the form of data packets which are separated by inter-packet gaps and are caused to proceed at a local clock rate and particularly to systems wherein data packets are transferred from one clock regime to another, as for example between one ASIC (application specific integrated circuit) and another. The invention also relates to the maintenance of a maximum theoretical rate of transmission of packets by the addition and removal of non-packet words (usually idle or preamble bytes).

BACKGROUND TO THE INVENTION

Packet handling devices, such as switches (both bridges and routers) repeater, hubs and the like are well known in the art of communication systems which employ data packets, such as Ethernet packets, for the conveyance of data from user to user. It is now customary to realise complex devices in the form of a multiplicity of interconnected 'chips' i.e. application specific integrated circuits which typically embody the physical layer devices (PHYs), media access control (MAC) devices, look-up engines, control registers and some, though not usually all, memory for the temporary storage of packets in the interval between the reception of packets by the device and their dispatch from a port or ports of the device. The invention is generally applicable in circumstances where a given device is constituted by more than one application specific integrated circuit.

In most packet-based communication systems, the data stream comprises packet data and words (usually bytes) which are of practical necessity but do not comprise message information. For example, in current Ethernet systems, there is a prescribed inter-packet gap constituted by 12 bytes, followed by 7 bytes of a 'preamble' and a 'start of frame delimiter' (SFD) byte (a total of 20 bytes), followed by the packet itself. The maximum theoretical packet rate is achieved when transmitting minimum-sized packets with a minimum allowed inter-packet spacing. The present invention concerns the maintenance of such a rate notwithstanding slight discrepancies in controlling clocks, for example between a media access control (MAC) device in one chip and a physical layer device (PHY) in a different chip which has its own crystal-controlled clock source.

It is obvious that a single device constituted by a plurality of ASICs should have in common a high precision clock frequency. In practice ASICs of this general nature require a set or suite of clock frequencies derived from or related to a master or top rate clock frequency. As a practical matter, different ASICs commonly have their own respective clock signal generating circuits and although theoretically the clock frequencies should be exactly the same, in practice there are small variations. This arises in particular when two such clock signals are derived from different crystal sources designed to have the same nominal frequency. In a system where there are or may be significant differences between clock frequencies on respective ASICs, it is necessary to employ at, for example, the receiving end of a link between ASICs an elasticity buffer into which data packets received over the link are written, usually one byte at a time, and read out at the local clock rate.

The present invention more particularly concerns operation wherein two adjacent clock domains have only slightly different clock frequencies, the difference being for example less than a few hundred parts per million.

If the clock in the receiving chip (e.g. the PHY) is slightly slower than that in the source (e.g. the MAC) there is significant danger that the 'elasticity buffer' will be overrun.

Various expedients are available to avert this danger, on the assumption that the proximity of the danger can be detected. Those which involve discarding whole packets are unsuitable for high performance systems and those which rely on high and low watermarks of a FIFO tend to require large FIFO's and unnecessary complexity. It is also possible to discard preamble bytes but by itself this is an inappropriate solution, because some devices in the network may require the full complement of preamble bytes for correct operation.

SUMMARY OF THE INVENTION

A feature of the invention concerns the detection of small differences between clock frequencies employing an elasticity buffer having a write process controlled by one clock and a read process controlled by a second clock. According to one aspect of the invention a buffer having a minimal number, and more particularly five recycling storage locations is employed to detect small differences in clock rates and to generate a resynchronisation command, which may indicate a need to discard a byte (from a preamble or inter-packet gap).

In a further aspect of the invention the resynchronisation command is employed to cause at an earlier stage (e.g. a MAC chip) the insertion of an extra preamble or idle byte pertinent to an inter-packet gap. The detection of the inserted byte may initiate the resynchronisation of the elasticity buffer and the subsequent discarding of the inserted byte.

Further features of the invention will be apparent from the following detailed description with references to the accompanying drawings.

DETAILED DESCRIPTION

Figure 1:
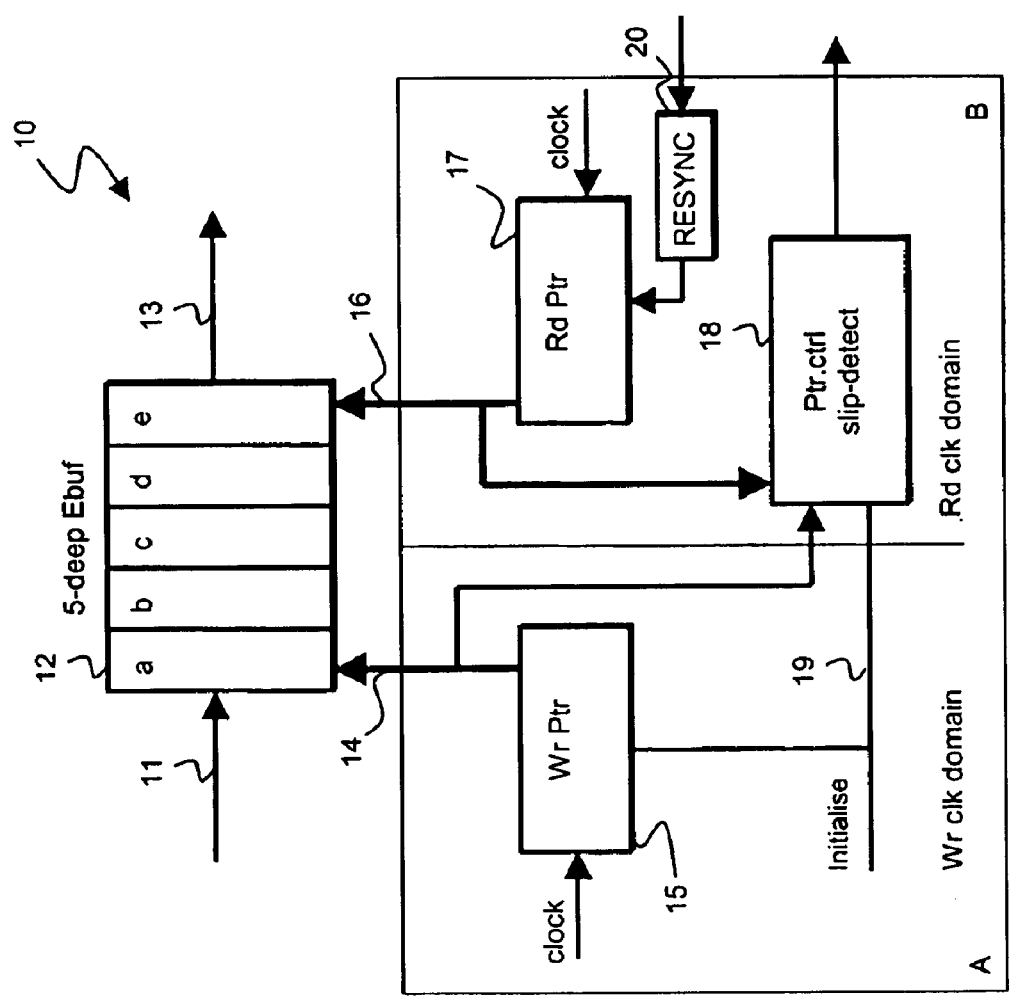
FIG. 1 is a schematic representation of a minimal elasticity buffer employed to detect minor variations in clock frequencies.

FIG. 1 of the drawings illustrates part of an interface between two domains, which have nominally identical clock frequencies which in practice may vary slightly, the range of variation being in the present invention not more than a few hundred parts per million.

The interface 10 shown in FIG. 1 has an input link, typically a multiplicity of lines on which for a given clock cycle the respective bits of a byte are transmitted, for example as described in published British patent applications numbers 2336074 and 2336075. As described in those earlier applications the eight data lines may be accompanied by a ninth or control line which may be employed for phase alignment of the signals on the various data lines.

It is presumed that data from a first ASIC (e.g. a MAC) is transmitted by a set of lines 11 in parallel form and successive bytes are stored in successive locations a, b, c, d and e of an elasticity buffer 12, being read out also in a cyclic fashion on data lines 13. Writing of input packets into the elasticity buffer is controlled by a write pointer 14, i.e. a set of signals which determine which location is selected for writing the byte, under the control of a write pointer generator 15 itself clocked by a clock in domain A. Bytes are read out from the elasticity buffer 12 in a cyclic sequence by means of a pointer 16 produced by a read pointer generator 17 controlled by a clock in domain B. The domain for clock A is termed herein the write clock domain whereas the domain for clock B is termed herein read clock domain. The write clock domain will be that pertaining to the ASIC from which the data has come and the read clock domain will be that of the ASIC which includes, or receives data from, the elasticity buffer 12.

The read clock domain includes a slip-detect circuit 18 which responds to the pointers 14 and 16 to determine the state of relative synchronism of the write clock and the read clock.

A five-deep elasticity buffer represents the smallest feasible buffer in the presence of jitter and small variation in the clock rate. Correct synchronised operation of the buffer requires the write pointer to be, for example, loading location a while the read pointer unloads location d. If read pointer is unloading location c or e in the same cycle as location a is loaded then jitter is present and the read clock is early and late relative to the write clock respectively. If it unloads location a, in the same cycle as location a is loaded, then synchronisation is required, the read clock being too early. If read clock unloads location b in the same cycle as location a is loaded, the read clock is too late and resynchronisation is needed.

It would be possible to employ an elasticity buffer with even fewer locations, specifically three, if corruption of the data stream were tolerable.

Figure 3:
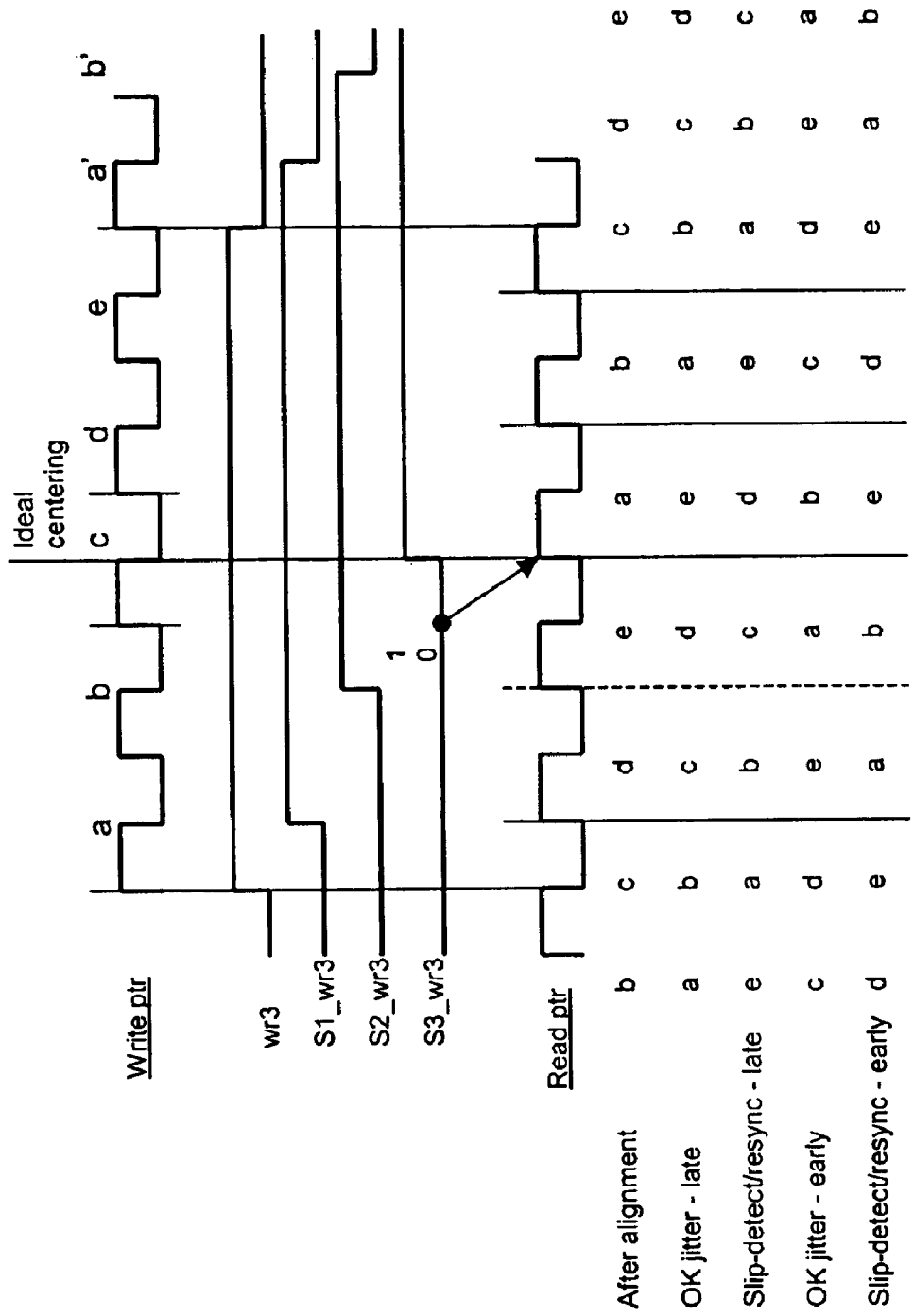
FIG. 3 is a diagram illustrating the operation of the elasticity buffer.

FIG. 3 illustrates (i) the write pointer (which toggles in sync with its controlling clock) and the positions of the write pointer for a succession of cycles of the write pointer clock (ii) the variation of an extra bit (wr3) of the write pointer (iii) the variation of three bits of the write pointer, (iv) the read pointer (which toggles in sync with its controlling clock) and (v) the significance of the various positions of the read pointer for the various positions of the write pointer. The extra bit is added to the 'count of five' write counter, which effectively counts to ten.

The block 18 compares, in the read clock domain, three bits of the read pointer with a single (synchronised) bit of the write pointer. These are sufficient to generate a signal indicating the occurrence of the positions that anticipate a need for the buffer to resynchronise, the read pointer relative to the write pointer and to cause discard of the byte. The toggle of the upper (wr3) bit will indicate an exact position of the write pointer once every five cycles, which is sufficiently frequent to provide an opportunity to resynchronise during a preamble (eight clock cycles) or an IPG gap (twelve clock cycles). The use of this single write bit means that only one bit has to cross the boundary between clock domains. It would be possible to perform the comparison in the write clock domain, employing the most significant bit of the read pointer and three bits of the write pointer, performing resynchronisation by controlling the write pointer, leaving the read pointer free running.

Figure 2:
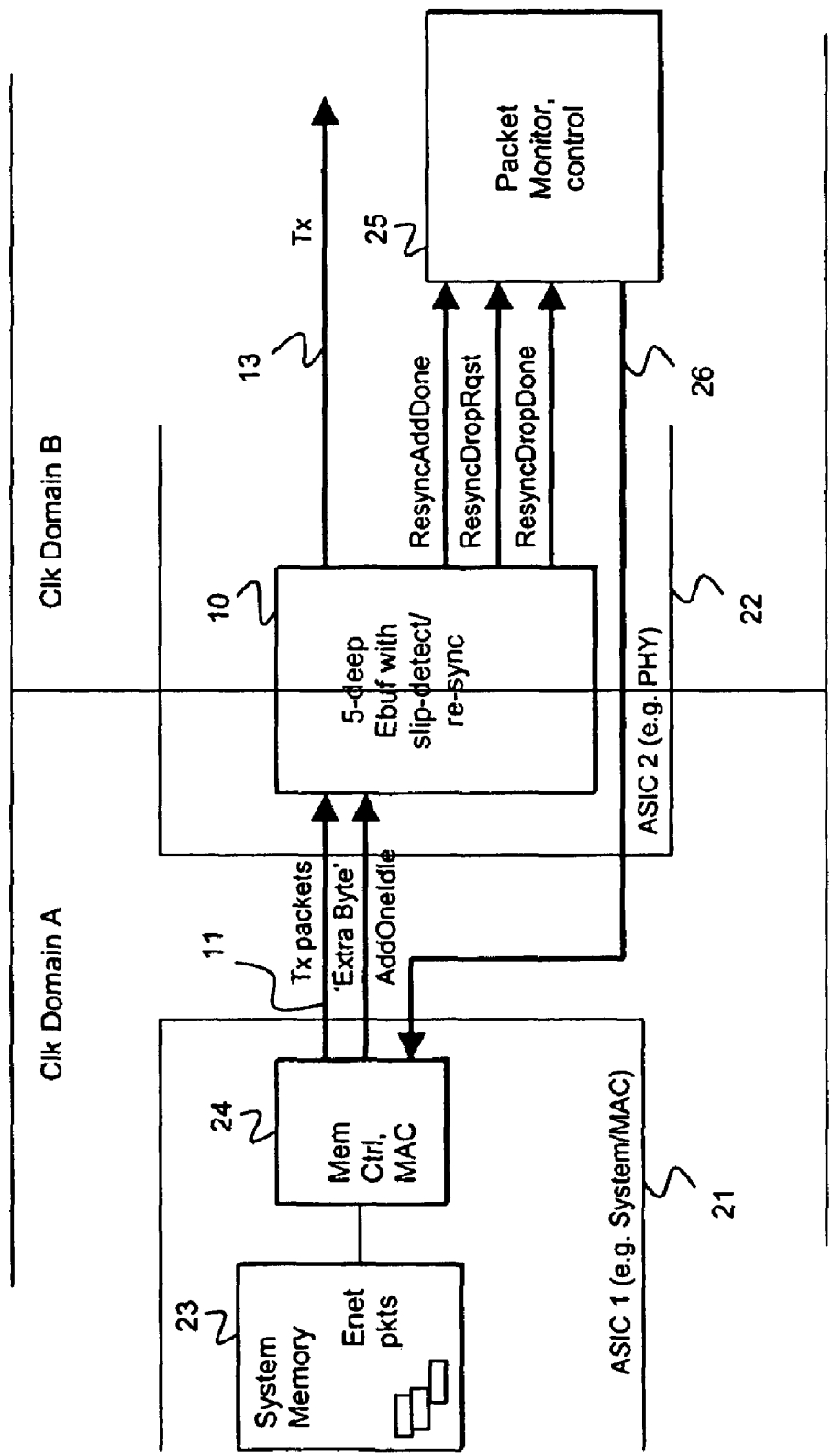
FIG. 2 is schematic diagram of an interface between application specific integrated circuits, employing an elasticity buffer as described with reference to FIG. 1.

FIG. 2 represents a system in which the subsystem 10 shown in FIG. 1 is employed in the maintenance of a maximum packet rate. A first ASIC 21 (e.g. a MAC) includes a system memory 23 and a memory control 24. Packet are read out from system memory at a rate determined by the clock frequency in clock domain A and conveyed by means of link 25 to ASIC 22 (e.g. a PHY). Such packets are received by the elasticity buffer 12 (FIG. 1), being written into and read out of the buffer as described with reference to FIG. 1.

FIG. 2 includes a packet monitor and control block 25 which is coupled across the clock domains to MAC 24 by means of a line 26. This line carries a one bit 'AddOneIdle' signal that toggles (i.e. changes from 0 to 1 or 1 to 0) when the MAC is instructed to add an idle byte to the data stream on line 11. The block 25 receives a signal 'ResyncAddDone' from subsystem 10, indicating that the buffer 12 has performed a resynchronisation and added an idle (by reading the same location twice). This signal is intended only for monitoring purposes. Block 25 receives a signal 'ResyncDropRqst' indicating that the buffer should discard a byte (by moving on two locations instead of one). In response to this signal block 25 toggles the signal on line 26. Block 25 also receives a signal (for monitoring purposes) denoted 'ResyncDropDone' when the buffer has discarded a byte.

The PHY also monitors for an indication (explained below) of the extra byte which has been added to the data stream by MAC 24 and in response to that indication causes the resynchronisation of the read pointer to drop the relevant byte.

The operation of the system is based on (a) the monitoring of the phase relationship of the read clock and write clock in terms of the positions of the read and write pointer; (b) the signalling by the slip detector (18) of the need to resynchronise; (c) the signalling of the upstream device to insert an extra byte; and (d) the detection of the extra byte and the consequential discard of the byte by the resynchronisation of the read pointer. In this manner the discrepancy between the clocks is compensated by an operation which will cause discard of a byte but an additional byte is inserted in anticipation of the discard.

One advantage of the invention is that the anticipation of the need to drop a byte allows the transmitter, in this example the MAC chip, sufficient time to prepare for and effect the insertion of the compensatory byte, at a position which is at the choice of the designer. The maximum time that the transmitter can delay in inserting the byte is a function of the difference in clock frequencies, the packet sizes and the size of the elastic buffer. In practice there are likely to be two or three packet times available.

In more detail, in the present example, the receiver, that is to say the PHY by monitoring the progression and the positional phase relationship of the read and write pointers will detect the need to resynchronise, particularly by advancing the read pointer by two locations, in a way that will have the effect of dropping a byte. In consequence, as indicated above, the 'AddOneIdle' signal is toggled. Although it would be possible to adopt some other form of indication, for example by sending a signal which is active high and deasserting that signal on reception of an acknowledgement from the transmitting MAC, the advantage of toggling the 'AddOneIdle' signal is that it is simple and it is not dependent on any circuitry which has to produce, for example, a signal which is long enough to be detected in a different clock domain.

The transmitter, the MAC 24, responds to the toggling of the 'AddOneIdle' signal and, in a manner which is simple in itself, increases the number of bytes between data portions of packets. In an Ethernet system wherein the inter-packet gap is 12 bytes, the inter-packet gap may be increased to 13 bytes. Alternatively, the preamble may be increased from 7 to 8 bytes. A MAC device may for example perform this insertion as part of the read out process of packet data from the system memory 23.

It is desirable for the MAC to indicate the existence and preferably the location of the added byte. This may be performed by any one of a variety of techniques. It could simply add a signal which is coded as a 'extra byte' signal, so that it is recognisable as a superfluous byte just as an. 'idle' byte is so recognised. Alternatively, it could encode such information with other packet control signals so that a 'extra byte tag' is aligned with the specific byte involved. The interfaces which are described in the aforementioned patent applications provide a control line in parallel with a multiplicity of data lines and the extra byte identifier may be carried on such a control line if desired. As a further alternative, the packet itself may be tagged in its header to indicate that it is preceded by a preamble of more than the usual length.

Finally, the PHY notes the 'extra byte' or the control code or tag indicating it, and as it extracts bytes from the elasticity buffer moves (by means of resync, circuit 20) the read pointer one position away from the direction of the write pointer, thereby dropping or discarding the required byte. The extra byte may be detected by appropriate control logic in the elasticity buffer, which logic is in a state awaiting the extra byte, because it has asserted 'ResyncDropRqst'. The byte is dropped by the resynchronising of the elasticity buffer and the signal 'ResyncDropDone' is toggled to indicate that the byte has been dropped.

The net effect is that the packet rate is identical to that produced by an ideal transmitter operating at the clock frequency of the PHY chip, at the maximum theoretical rate within the tolerance allowed.

When the PHY crystal is slightly faster than the MAC crystal, that is to say the signal in clock domain B is slightly faster than the signal in clock domain A, there is no need for the PHY to communicate with the MAC. The elastic buffer itself may detect when it is close to the point where the read pointer catches up on the write pointer, that is to say within one location of it, and that may be used during, for example, the inter-packet gap, to cause the reading of the same location twice, which will effectively add an idle byte while resynchronising the read pointer.

What is claimed is:

1. A system for transferring a data stream comprising data packets separated by non-packet words from a first clock domain to a second clock domain, the clock domains having similar but not necessarily identical clock frequencies, comprising:
    an elasticity buffer consisting of at least three and not more than five storage locations:
    means for writing the data stream into the elasticity buffer in a cyclic sequence of said storage locations by means of a write pointer under the control of a write clock in the first clock domain,
    means for reading the data stream out of said storage locations of the elasticity buffer in said cyclic sequence by means of a read pointer under the control of a read clock in the second domain;
    a slip detector for monitoring the write and read pointers to determine the relative cyclic phase of said two pointers, said slip detector:
    (i) providing an anticipatory signal by monitoring proximity of a reading sequence to a writing sequence indicating that the read clock is too late when the write pointer denotes a first one of said storage locations and the read pointer denotes the next one of said storage locations in said cyclic sequence;
    (ii) by monitoring proximity of the reading sequence to a beginning of the buffer indicating that said read clock is too early when the write pointer denotes said first one of said storage locations and the read pointer denotes said first one of said storage locations in said cyclic sequence;
    means in the first clock domain for inserting in response to said anticipatory signal indicating that the read clock is too late, non-packet word into said data stream; and
    means in the second clock domain for detecting the existence of the inserted non-packet word and for causing the buffer to advance the read cycle thereby to discard the inserted non-packet word.

2. A system as in claim 1 wherein the inserted non-packet word is an idle byte.

3. A system for transferring a data stream of data packets separated by non-packet words, said system including:
    a media access control device;
    a physical layer device;
    an elasticity buffer consisting of at least three and not more than five storage locations;
    means in said physical layer device for writing the data stream into the elasticity buffer in a cyclic sequence of said storage locations by means of a write pointer under the control of a write clock,
    means in said media access control device for reading the data stream out of said storage locations of the elasticity buffer in said cyclic sequence by means of a read pointer under the control of a read clock, said read clock having a frequency nominally the same as the frequency of said write clock;
    a slip detector for monitoring the write and read pointers to determine the relative cyclic phase of said two pointers, said slip detector:
    (i) providing an anticipatory signal by monitoring proximity of the reading sequence to a beginning of the buffer indicating that read clock is too late when the write pointer denotes a first one of said storage locations and the read pointer denotes the next one of said storage locations in said cyclic sequence;
    (ii) by monitoring proximity of the reading sequence to a beginning of the buffer indicating that said read clock is too early when the write pointer denotes said first one of said storage locations and the read pointer denotes said first one of said storage locations in said cyclic sequence;
    means in the first clock domain for inserting in response to said anticipatory signal indicating that the read clock is too late, a non-packet word into said data stream; and
    means in the second clock domain for detecting the existence of the inserted non-packet word and for causing the buffer to advance the read cycle thereby to discard the inserted non-packet word.

4. A buffer system for transferring a data stream essentially consisting of a succession of data words from a first clock domain to a second clock domain, said system comprising:
    an elasticity buffer having a maximum of five storage locations whereby the buffer can store a maximum of five data words;
    means for writing the data stream into the elasticity buffer in a cyclic sequence of said storage locations by means of a write pointer under the control of a write clock in the first clock domain, means for reading the data stream out of said storage locations of the elasticity buffer in said cyclic sequence by means of a read pointer under the control of a read clock in the second domain;

a slip detector for monitoring the write and read pointers to determine the relative cyclic phase of said two pointers, said slip detector;

(i) providing an anticipatory signal by monitoring proximity of a reading sequence to a writing sequence indicating that the read clock is too late when the write pointer denotes a first one of said storage locations and the read pointer denotes the next one of said storage locations in said cyclic sequence;

(ii) by monitoring proximity of the reading sequence to a beginning of the buffer indicating that said read clock is too early when the write pointer denotes said first one of said storage locations and the read pointer denotes said first one of said storage locations in said cyclic sequence.

5. A system as in claim 4 wherein each of said storage locations stores one data byte.

6. A system as in claim 1 wherein said elasticity buffer consists of five of said storage locations and said slip detector indicates;

acceptable jitter when said write pointer denotes said first one of said storage locations and said read pointer denotes the next storage location but one after said first one of said storage locations in said cyclic sequence;

synchronized operation of said elasticity buffer when said write pointer denotes said first one of said storage locations and said read pointer denotes the next storage location but two after the first one of said storage locations in said cyclic sequence; and acceptable jitter when said write pointer denotes said first one of said storage locations and said read pointer denotes the next storage location but three after said first one of said storage locations in said cyclic sequence.

7. A buffer system as in claim 4 wherein said elasticity buffer consists of five of said storage locations and said slip detector indicates:

allowable jitter when said write pointer denotes said first one of said storage locations and said read pointer denotes the next storage location but one after said first one of said storage locations in said cyclic sequence;

synchronized operation of said elasticity buffer when said write pointer denotes said first one of said storage locations and said read pointer denotes the next storage location but two after said first one of said storage locations in said cyclic sequence; and allowable jitter when said write pointer denotes said first ne of said storage locations and said read pointer denotes the next storage location but three after said first one of said storage locations in said cyclic sequence.

8. A method for transferring a data stream comprising data packets separated by non-packet words from a first clock domain to a second clock domain, the clock domains having similar but not necessarily identical clock frequencies, said method comprising:

maintaining an elasticity buffer consisting of at least three and not more than five storage locations;

writing the data stream into the elasticity buffer in a cyclic sequence of said storage locations by means of a write pointer under the control of a write clock in the first clock domain, reading the data stream out of said storage locations of the elasticity buffer in said cyclic sequence by means of a read pointer under the control of a read clock in the second domain;

monitoring the write and read pointers to determine the relative cyclic phase of said two pointers thereby:

(i) providing an anticipatory signal by monitoring proximity of a reading sequence to a writing sequence indicating that the read clock is too late when the write pointer denotes a first one of said storage locations and the read pointer denotes the next one of said storage locations in said cyclic sequence;

(ii) by monitoring proximity of the reading sequence to a beginning of the buffer indicating that said read clock is too early when the write pointer denotes said first one of said storage locations and the read pointer denotes said first one of said storage locations in said cyclic sequence;

inserting in the first clock domain in response to said anticipatory signal indicating that the read clock is too late, a non-packet word into said data stream; and detecting, in the second clock domain, the existence of the inserted non-packet word and causing the buffer to advance the read cycle thereby to discard the inserted non-packet word.

9. A method as in claim 8 wherein the inserted non-packet word is an idle byte.

10. A method as in claim 8 wherein said elasticity buffer consists of five of said storage locations and said method indicates;

acceptable jitter when said write pointer denotes said first one of said storage locations and said read pointer denotes the next storage location but one after said first one of said storage locations in said cyclic sequence;

synchronized operation of said elasticity buffer when said write pointer denotes said first one of said storage locations and said read pointer denotes the next storage location but two after said first one of said storage locations in said cyclic sequence; and acceptable jitter when said write pointer denotes said first one of said storage locations and said read pointer denotes the next storage location but three after said first one of said storage locations in said cyclic sequence.

* * * * *